US008219475B2

(12) United States Patent
Seaman

(10) Patent No.: US 8,219,475 B2
(45) Date of Patent: Jul. 10, 2012

(54) METHOD AND SYSTEM FOR ADMINISTERING A DISCOUNTED SECURITY

(75) Inventor: David A. Seaman, Short Hills, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 43 days.

(21) Appl. No.: 12/944,709

(22) Filed: Nov. 11, 2010

(65) Prior Publication Data

US 2011/0060679 A1    Mar. 10, 2011

Related U.S. Application Data

(62) Division of application No. 09/769,999, filed on Jan. 25, 2001, now Pat. No. 7,865,417.

(51) Int. Cl.
*G06Q 40/00* (2012.01)
(52) U.S. Cl. .......................................... 705/35; 705/37
(58) Field of Classification Search ............... 705/35–45
See application file for complete search history.

(56) References Cited

U.S. PATENT DOCUMENTS

| | | | |
|---|---|---|---|
| 5,692,233 A | 11/1997 | Garman | |
| 5,802,499 A | 9/1998 | Sampson et al. | |
| 5,812,988 A | 9/1998 | Sandretto | |
| 5,819,237 A | 10/1998 | Garman | |
| 5,819,238 A | 10/1998 | Fernholz | |
| 5,845,265 A | 12/1998 | Woolston | |
| 5,845,266 A | 12/1998 | Lupien et al. | |
| 5,852,811 A | 12/1998 | Atkins | |
| 5,884,286 A | 3/1999 | Daughtery, III | |
| 5,893,078 A | 4/1999 | Paulson | |
| 5,913,202 A | 6/1999 | Motoyama | |
| 5,926,800 A | 7/1999 | Baronowski et al. | |
| 5,940,810 A | 8/1999 | Traub et al. | |
| 5,946,667 A | 8/1999 | Tull, Jr. et al. | |
| 5,950,175 A | 9/1999 | Austin | |
| 5,950,176 A | 9/1999 | Keiser et al. | |
| 5,950,177 A | 9/1999 | Lupien et al. | |
| 5,963,923 A | 10/1999 | Garber | |
| 5,970,479 A | 10/1999 | Shepherd | |
| 5,978,780 A | 11/1999 | Watson | |
| 5,987,435 A | 11/1999 | Weiss et al. | |
| 6,012,042 A | 1/2000 | Black et al. | |

(Continued)

OTHER PUBLICATIONS

Dialog(R)File 621:(c) 2011 Gale/Cengage. All rts. reserv. 04069075 Supplier No. 131709355 (Use Format 7 for Fulltext) The American Stock Exchange Lists ABN AMRO 11% Reverse Exchangeable Securities Linked to JP Morgan Chase & Co.*
Dialog(R)File 20:Dialog Global Reporter (c) 2011 Dialog. All rts. reserv. 12249526 (This is the Fulltext) Jardine Matheson to issue 550 min usd in exchangeable bonds.*
(Item 3 from file: 20) Dialog(R)File 20:Dialog Global Reporter (c) 2011 Dialog. All rts. reserv. 30206386 (Use Format 7 or 9 for Fulltext) HVB launches 265m exchangeable bond.*

(Continued)

*Primary Examiner* — Richard C Weisberger
(74) *Attorney, Agent, or Firm* — Lowenstein Sandler PC

(57) ABSTRACT

An exchangeable security, tradable on a securities exchange is issued at a share price that is a discount from the share price of an underlying security or basket of underlying securities. At or prior to maturity of the exchangeable security, a holder of the exchangeable security may exchange a share of the exchangeable security for a share of the underlying security or basket of underlying securities. The exchangeable security may also include a linked payment that is redeemable for the full amount of the payment on maturity of the exchangeable security. Alternatively, the exchangeable security may be issued at the share price of the underlying security with the linked payment. The invention provides methods for issue, trade and redemption as well as systems for issue, trade and redemption of the security.

10 Claims, 3 Drawing Sheets

U.S. PATENT DOCUMENTS

| | | | |
|---|---|---|---|
| 6,012,046 | A | 1/2000 | Lupien et al. |
| 6,016,483 | A | 1/2000 | Rickard et al. |
| 6,018,721 | A | 1/2000 | Aziz et al. |
| 6,018,722 | A | 1/2000 | Ray et al. |
| 6,021,397 | A | 2/2000 | Jones et al. |
| 6,021,398 | A | 2/2000 | Ausubel |
| 6,026,383 | A | 2/2000 | Ausubel |
| 6,058,379 | A | 5/2000 | Odom et al. |
| 6,061,662 | A | 5/2000 | Makivic |
| 6,076,072 | A | 6/2000 | Libman |
| 6,078,903 | A | 6/2000 | Kealhofer |
| 6,078,904 | A | 6/2000 | Rebane |
| 6,085,176 | A | 7/2000 | Woolston |
| 6,088,685 | A | 7/2000 | Kiron et al. |
| 6,092,056 | A | 7/2000 | Tull, Jr. et al. |
| 6,098,051 | A | 8/2000 | Lupien et al. |
| 6,321,212 | B1 | 11/2001 | Lange |
| 6,421,653 | B1 | 7/2002 | May |
| 6,493,682 | B1 | 12/2002 | Horrigan et al. |
| 2002/0091621 | A1 | 7/2002 | Conklin et al. |

OTHER PUBLICATIONS

Garrity, Brian, What's in a name? Confusion, The Investment Dealer's Digest, Oct. 5, 1998.

Kroll, Arthur H., Exploring Options, Oct. 1997.

BOXES Prospectus, Morgan Stanley Dean Witter & Co., Basket Opportunity eXchangeable Securities (SM), Pricing Supplement, Jan. 29, 2002, Prospectus dated Jan. 24, 2001, http://www.sec.gov/Archives/edgar/data/895421/000090342302000046/msdw424b3_1-30.txt.

Prospectus Supplement No. 150, The Goldman Sachs Group, Inc., Medium-Term Notes, Series B, Oct. 25, 2000.

Prospectus, Holders Semiconductor, Merrill Lynch & Co., A.G. Edwards & Sons, Inc., May 4, 2000.

Prospectus, Pricing Supplement No. 53, Morgan Stanley Dean Witter & Co., Medium Terms Notes, Series C, Mar. 30, 2000.

Prospectus Supplement, Securities Jefferson-Pilot Corporation, Goldman, Sachs & Co., Merrill Lynch & Co., Nov. 27, 1995.

* cited by examiner

METHOD AND SYSTEM FOR ADMINISTERING A DISCOUNTED SECURITY

CROSS-REFERENCE TO RELATED APPLICATIONS

This application is a divisional of U.S. patent application Ser. No. 09/769,999 filed on Jan. 25, 2001.

BACKGROUND

1. Field of the Invention

The invention is related to the field of financial instruments, and more particularly to the field of discounted securities.

2. Description of the Related Art

There are a number of different types of financial instruments, many of which are subject to different types of regulation, depending on certain characteristics of the instrument. Because of the various different type of regulations, and any exemptions from the regulations, there may be limits on who may issue the instrument, who may buy or trade the instrument, the circumstances under which the instrument may be traded, the types of exchanges, if any, that the instrument may be traded on, and restrictions on an instrument holder's ability to transfer the instrument.

Smaller and individual investors are generally able to take advantage of instruments that are listed and traded on one of the many different types of exchange. These exchanges include the New York Stock Exchange ("NYSE"), the American Stock Exchange ("AMEX"), the National Association of Securities Dealers Automated Quotations ("NASDAQ"), the Chicago Board of Trade, the Chicago Board Options Exchange, the Chicago Mercantile Exchange, the Commodity Exchange, and the New York Futures Exchange, to name a few. Depending on the type of instrument that is traded on the exchange, the instrument may be regulated by the Securities and Exchange Commission ("SEC") or the Commodities Futures Trading Commission. However, this does not mean that all financial instruments are traded on one of the exchanges. Parties may individually contract or agree to a financial instrument with certain terms, but the instrument may not be traded on one of the exchanges because the parties have not asked for or received the required clearance or approval.

There is a particular type of instrument or agreement, called a forward securities contract, where one of the parties agrees to deliver securities to the other party at a future date. The party promising to deliver the securities in the future is said to have sold or issued the forward securities contract, while the party who will get the securities in the future is said to have purchased or received the forward securities contract. If payment will be made or netted in the future, at final settlement, the forward is deemed to be a futures contract, or a deferred forward contract. If the payment is made up front, the instrument is deemed to be a prepaid forward contract. Typically, the party purchasing the deferred forward pays a premium for the forward over the current or spot price of the security. However, it is conceivable that there are circumstances where a deferred forward securities contract between the parties is made at less than the current or spot price.

One of the challenges with the forward securities contract is that it is a bilateral contract between two parties, and is therefore not easily assigned, transferred, exchanged or sold to others. In this regard, it is the type of financial instrument that is available to larger institutional investors, but not generally available to the individual investor because it is not traded or tradable on one of the securities exchanges. There are other types of financial instruments that are also less available to individual investors as they are not traded or tradable on a securities exchange. Recently enacted legislation now contemplates the trading of securities futures contracts on a securities exchange (i.e., contracts that may be entered into with a small initial investment, contracts that are subject to margining and exchange offset, and contracts that may or may not have cash or physical delivery). For this reason, it is advantageous if financial instruments that are traditionally not traded or tradable on a securities exchange can be re-structured or configured so that they can be traded on a securities exchange. However, whether an instrument is exchange tradable is not necessarily determinative in the instant invention.

Futures trading is often deemed risky for individual investors due to the implied leverage of the future (i.e., the initial investment is far less than the notional amount of the contract). Securities futures are akin to exchange traded deferred forwards.

The preceding description is not to be construed as an admission that any of the description is prior art relative to the present invention.

SUMMARY OF THE INVENTION

In one aspect, the instant invention concerns a hybrid security, which is a special kind of prepaid forward contract.

In one aspect and embodiment, the instant invention provides a system and method for offer and exchange of an exchangeable security. A price of an underlying security, or basket of securities is determined, and a discount of that price is calculated. An exchangeable security is offered at the discount price, and at a later time, the exchangeable security is exchanged for a share of the underlying security or basket of securities. The exchange may occur at maturity, or before maturity. An additional payment may be calculated at the time the exchangeable security is offered, with the additional payment provided at maturity of the exchangeable security.

In one aspect and embodiment, the instant invention provides a system and method for offer and exchange of an exchangeable security. A price of an underlying security, or basket of securities is determined, and an exchangeable security is offered at the price. Before offering the exchangeable security, an additional payment amount is also determined. At a later time, the exchangeable security is exchanged for a share of the underlying security or basket of securities. The exchange may occur at maturity, or before maturity. If the exchangeable security is held to maturity, the additional payment is provided at maturity.

In one aspect and embodiment, the instant invention provides an exchangeable security, traded on a securities exchange. A price of an underlying security, or basket of securities is determined, and a discount of that price is calculated. The exchangeable security is offered initially at the discount price, and at a later time, the exchangeable security is exchanged for a share of the underlying security or basket of securities. The exchange may occur at maturity, or before maturity. An additional payment may be calculated at the time the exchangeable security is offered, and if the exchangeable security is held to maturity, the additional payment is provided at maturity.

In one aspect and embodiment, the instant invention provides an exchangeable security, traded on a securities exchange. A price of an underlying security, or basket of securities is determined, and the exchangeable security is offered at the price. Before offering the exchangeable security, an additional payment amount is also determined. At a later time, the exchangeable security is exchanged for a share of the underlying security or basket of securities. The exchange may occur at maturity, or before maturity. If the exchangeable security is held to maturity, the additional payment is provided at maturity.

In one aspect and embodiment, the instant invention provides computer executable software code transmitted as an information signal, or computer-readable media having computer executable software code stored thereon, the code for offering and exchanging an exchangeable security. The code determines a price of an underlying security, or basket of securities, and calculates a discount of that price. The code offers an exchangeable security at the discount price, and at a later time, the code exchanges the exchangeable security for a share of the underlying security or basket of securities. The exchange may occur at maturity, or before maturity. The code may calculate an additional payment at the time the exchangeable security is offered, and if the exchangeable security is held to maturity, the additional payment is provided at maturity.

In one aspect and embodiment, the instant invention provides computer executable software code transmitted as an information signal, or computer-readable media having computer executable software code stored thereon, the code for offering and exchanging an exchangeable security. The code determines a price of an underlying security, or basket of securities, and the code offers an exchangeable security at the price. Before offering the exchangeable security, the code determines an additional payment amount. At a later time, the code exchanges the exchangeable security for a share of the underlying security or basket of securities. The exchange may occur at maturity, or before maturity. If the exchangeable security is held to maturity, the code provides the additional payment at maturity.

The foregoing specific aspects and advantages of the invention are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

Figure 1:
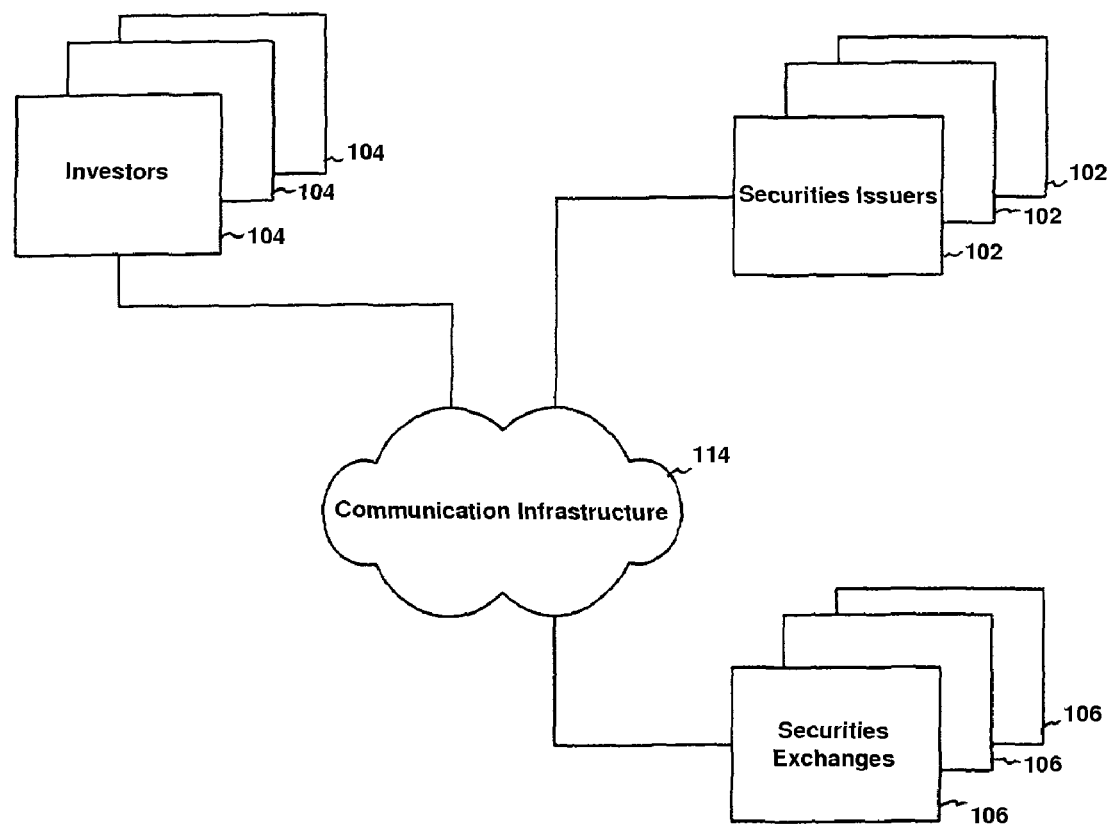
FIG. 1 illustrates a system according to an embodiment of the instant invention.

It is understood that the drawings are for illustration only and are not limiting.

DETAILED DESCRIPTION OF THE DRAWINGS

In one aspect, the instant invention allows an investor to receive some of the benefit implied in the forward market. By issuing a new exchangeable security which delivers an underlying and existing security or basket of securities at a forward date, and holding the new exchangeable security for a minimum period of time, an investor will get more than the return of underlying security. For example, at issue of the new exchangeable security, the investor pays a discount to the spot or market price of the underlying security or basket of securities and receives at maturity the underlying security or basket of securities. Alternatively, at issue of the new exchangeable security, the investor pays the spot or market price of the underlying security or basket of securities and receives at maturity the underlying security or basket of securities plus an additional payment. Or finally, at issue of the new exchangeable security, the investor pays a discount to the spot or market price of the underlying security or basket of securities and receives at maturity the underlying security or basket of securities plus an additional payment.

The instant invention is applicable to a single underlying security, or an underlying basket of securities. The single underlying security, the underlying basket of securities, or the new exchangeable security of the instant invention may or may not be listed or traded on a securities exchange. In one embodiment, at maturity of the new exchangeable security, the investor receives the underlying security or basket of securities in kind (i.e. security for security) and/or cash.

The redemption formula at maturity for the new exchangeable security is written generally as:

$$redemption\_value = face + (end - forward)$$

where face is the forward plus a nominal amount, if any (e.g., $0.50, which is the additional payment of the invention), end is the closing price of the underlying security or basket of securities at maturity, or immediately prior to maturity, and forward is calculated as at or above the current spot or market price of the underlying security or basket of securities. Thus, for example, the forward is calculated as follows:

$$forward = (1 + rate)^n * spot,$$

where rate is the zero coupon annual compound rate at which the borrower pays for funds (L-10 bps), n is the maturity in years, and spot is the current spot or market price of the underlying security. Using this example, if rate is 7.43%, n=2 and spot or market=60.00, then the forward is 1.154*$60.00=$69.25, and the face is $69.75.

Alternatively, the redemption formula at maturity for the new exchangeable security is written generally as:

$$redemption\_value = (end + nom\_amount)$$

where nom_amount is a nominal amount, and end is the closing price of the underlying security or basket of securities at maturity, or immediately prior to maturity. This is because:

$$face = (forward + nom\_amount), then$$

$$redemption\_value = (forward + nom\_amount) + (end - forward)$$

which simplifies to:

$$redemption\_value = (nom\_amount + end)$$

When an additional payment accompanies or is linked to the new exchangeable security, it is a single payment at maturity.

The instant invention is distinguishable from the recently authorized securities futures in that the instant invention is prepaid (fully paid for up front), while the recently authorized securities futures are not. Also, futures are subject to margining, while the new exchangeable security of the instant invention is not. Further, single stock or basket securities futures contracts may not be available on all stocks or baskets or the stocks underlying a particular issuance of the new exchangeable security of the instant invention. Finally, futures tend to have standardized terms (size, maturity, etc.) that can not be varied, while those limitations are not present in the new exchangeable security of the instant invention.

The instant invention is different from existing or known prepaid forwards. The known prepaid forwards have market payments, with payments between 50% and 150% of the market coupon of the issuer.

In one embodiment, the new exchangeable security of the instant invention has in effect a zero coupon (i.e., there are no periodic payments), which is generally redeemable at or after maturity of the new exchangeable security. The known prepaid forwards have leverage against the underlying security that is 1:1 or less (i.e., they deliver less than one share in the future under some circumstances). The new exchangeable security of the instant invention has 1:1 leverage against the underlying security, as long as the new exchangeable security is held to maturity (i.e., the exchangeable security always delivers one share of the underlying security).

In another difference, the known prepaid forwards have returns that always have some outcome that could be less than the return of the underlying security as long as it is held to maturity. The new exchangeable security of the instant invention has an outcome that generally exceeds the return of the underlying security, as long as the new security is held to maturity.

The only way that an investor can replicate the performance of the new exchangeable security of the instant invention is to buy the underlying security forward (which is only available via the over-the-counter ("OTC") market and to large institutional investors), or via a like maturity securities futures contract. At the same time, the investor invests in a zero coupon security of similar credit risk as an issuer of the new exchangeable security of the instant invention. At maturity of the forward contract or futures contract, the buyer must sell the zero coupon security and take its proceeds and deliver them for payment of the OTC forward or securities futures contract (e.g., use proceeds for payment at a forward date). However, even if the investor can replicate the performance in this manner using a combination of instruments, they will be unable to treat the combination as a single security regulated by the SEC, with the liquidity and ease of trading that is available to a single security traded on an exchange.

System of the Invention

Conceptually, the method of the instant invention can be accomplished by hand. However, it is advantageous to perform the method in an automated manner. A system, as illustrated in FIG. 1 is appropriate for that purpose.

As illustrated, system 100 includes issuers of securities 102, investors 104, securities exchanges 106 and various elements of communication infrastructure 114 to interconnect issuers 102, investors 104, and exchanges 106. In the embodiment illustrated, the infrastructure is the Internet. However, other types of communication infrastructure, such as circuit switched telephony, packet switched telephony, wired and wireless links, and equivalents are all considered communication infrastructure.

Figure 2:
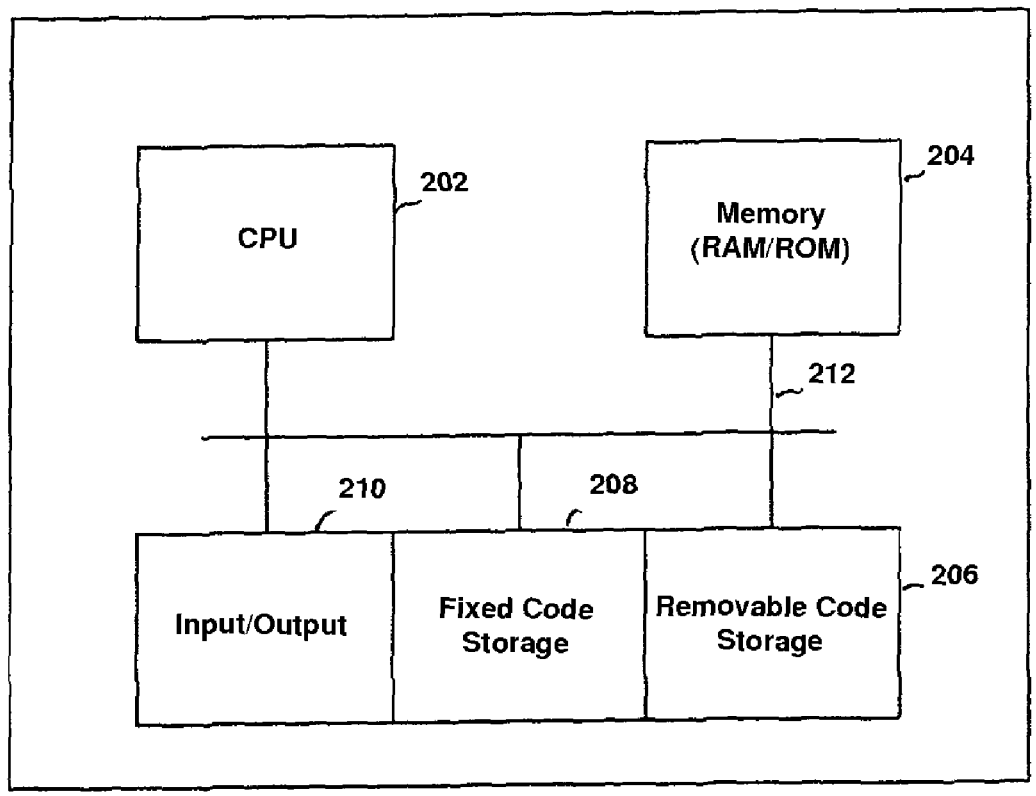
FIG. 2 illustrates elements of a system according to an embodiment of the instant invention.

Each of issuers 102, investors 104, and exchanges 106, have computer systems 200, which facilitate some of the aspects of the invention. Referring to FIG. 2, an embodiment of a typical computer system 200 includes a central processor unit (CPU) 202, a memory 204, a removable storage media 206, a fixed storage media 208 and input/output including a user interface 210, each of which is interconnected using internal data bus 212. Computer 200 runs various computer programs, or software which include operating systems, applications programs, and equivalents. The computer programs may also include telephony communications programs, or network interface programs.

In one embodiment, computer 200 is a personal, desktop, laptop, personal digital assistant type of computer, or equivalent. Depending on the configuration, it may include a PENTIUM or similar class CPU 202. Memory 204 includes read only memory (ROM) and random access memory (RAM) with all of the equivalent variations thereof (EPROM, DRAM, SDRAM, etc.). Memory 204 is interconnected to CPU 202 and other elements of computer 200 by bus 212, which provides signal connection and a path for the exchange of data and information between the elements of computer 200.

In the illustrated embodiment, removable storage media 206 and fixed storage media 208 includes magnetic disk drives, both removable floppy and hard disk, flash memory chips or modules, as well as optical storage or compact disk (CD), their equivalents and the associated drives. Removable storage media 206 and fixed storage media 208 can include both applications program instructions and data for the applications programs and their equivalents.

In the illustrated embodiment, input/output and user interface 210 includes keyboards, voice recognition software, and graphical display pointers (e.g. mouse, trackball, touchscreen & electronic pens), video display terminals, and equivalents, all of which allow a user to interface with and control computer 200.

In the illustrated embodiment, output device 210 includes data display terminals, printers, facsimile, e-mail, Internet connection and any of the equivalent types of devices which can be used to convert electronic information or data into an understandable form. Output device 210 provides any information or data generated or modified by computer 200 according to inputs using the method further described below.

In the illustrated embodiment, input device 210 includes network interface cards, modems, scanners, facsimile with optical character readable capability, and other equivalent devices which can convert information into a form that is useable by computer 200. It is possible that input device 210 and output device 210 are functions of the same device, such as a network interface card.

In one embodiment, computer software code is stored on removable media and the removable media is used to transport and load the software code on computer 200. In another embodiment, computer software code is stored at a central facility, and the code is transmitted as an information signal to computer 200, where it is permanently or temporarily stored, or possibly loaded directly into dynamic memory and run directly. In another embodiment, computer software code is stored in memory of computer 200 and processor 202 executes the computer software code.

Various input data are provided to computer 200 through input device 210. Input data includes market or spot price of securities, rate borrowers pay for funds, current date, maturity date of securities, discount rates and coupon rates to name a few.

Method of the Invention

Figure 3:
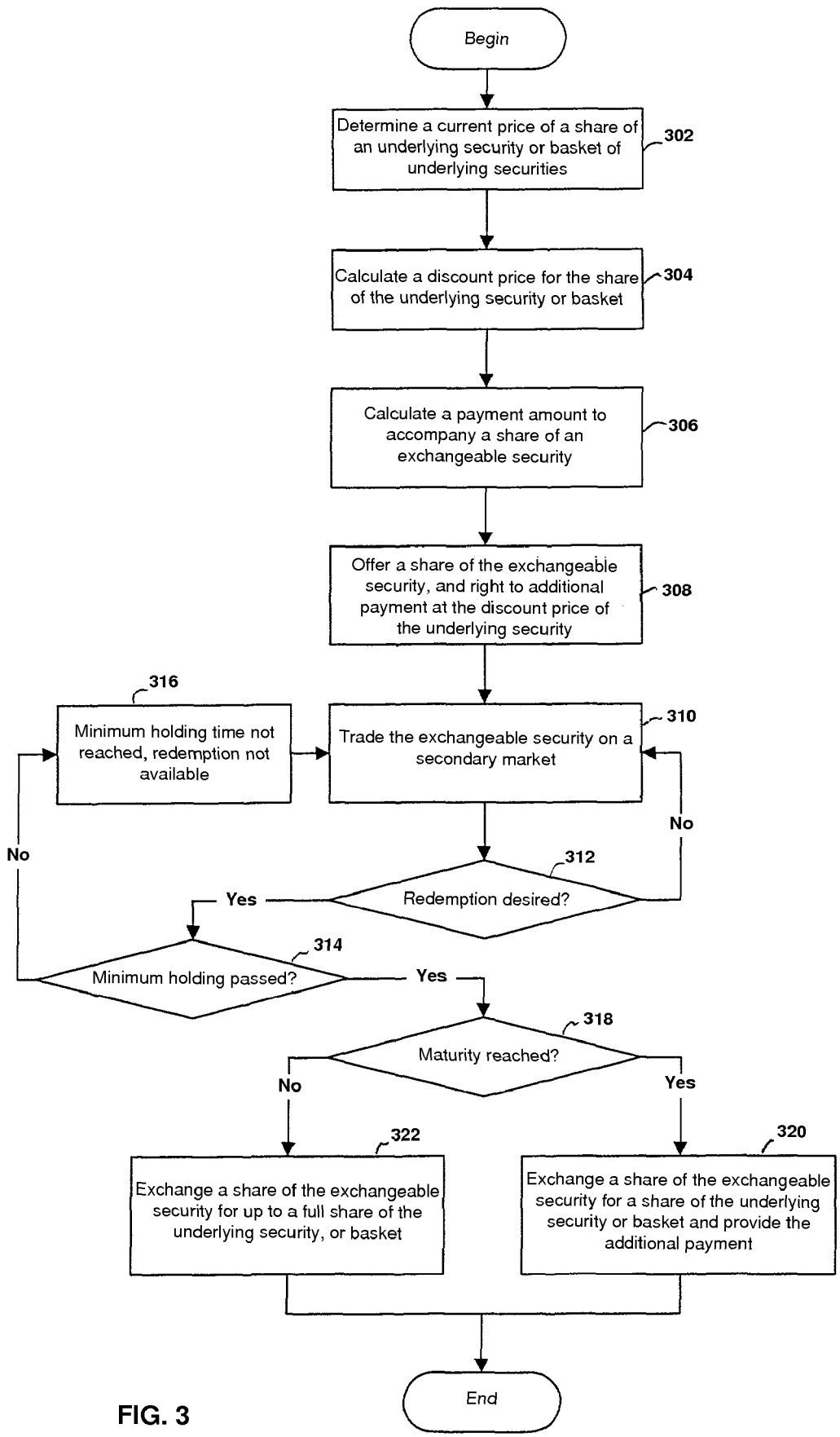
FIG. 3 illustrates a method according to an embodiment of the instant invention.

Referring to FIG. 3, in one embodiment of the instant invention, at step 302, an issuer 102 using system 100 determines a market or spot price of a share of an underlying security or basket of securities. The share price may be a market price, determined by reference to a market where the security is currently traded, or it may be a closing price of the security, at the end of the previous trading day.

At step 304, issuer 102 using system 100 calculates a discount price for the underlying security or basket of securities and associated offer or issue price for a share of the exchangeable security. The discount may be a percentage of the market or spot price of the underlying, such as one half of one percent, or it may be a fixed amount, such as fifty cents. In one embodiment, the discount is between $0.50 and $1.00.

At step 306, issuer 102 using system 100 calculates an additional payment amount, which will be paid at maturity of the exchangeable security. The payment amount may be a percentage of the offer or issue price of the exchangeable security, such as one half of one percent, or it may be a fixed amount. In one embodiment, the payment amount is between $0.50 and $1.00.

It is possible, but not required, that the discount calculated at step 304 and the payment amount calculated at step 306 are the same amounts.

At step 308, issuer 102 using system 100 issues or offers for sale a share of the exchangeable security, and the linked payment in the amount calculated at step 306. The price of the share of the exchangeable security, which is issued or offered at step 308 is the discount price of the underlying security that was calculated at step 304. The shares of the exchangeable security, issued at step 308, are similar to other securities, in that there are various required regulatory steps prior to issue, restrictions on who can issue the shares, where and how the shares may be traded, who the shares may be sold to etc. Though not illustrated in FIG. 3, all of those preliminary steps must have been completed prior to issuer 102 issuing the exchangeable security at step 308. Issue of the exchangeable security at step 308 is accomplished in the same manner as issue of other securities, such as an initial public offering, a follow-on public offering etc.

Once issued, then at step 310, the exchangeable securities can trade in a secondary market on a securities exchange 106 of system 100. Securities exchange 106 can be the American Stock Exchange (AMEX), the New York Stock Exchange (NYSE), the Pacific Stock Exchange (PSE), or any of a number of securities exchanges, such as exchanges regulated by the SEC.

The exchangeable security is somewhat like a debt security with a fixed maturity date and without periodic coupon payments. According to the instant invention, on or after a specified date, the holder of the exchangeable security may redeem the exchangeable security for a share of the underlying security. The specified date may be the maturity date of the exchangeable security, or it may be a date between issue and maturity (e.g., after a minimum holding period). If the specified date is the maturity date, the holder of the exchangeable security may receive an additional payment amount. Thus, in a normal course of business, after buying one share of the exchangeable security at issue for a price that represents a discount of the spot or market price of the underlying security or basket of securities, and holding the exchangeable security until maturity, the holder receives a share of the underlying security in return for surrender of a share of the exchangeable security. The holder of the exchangeable security also receives the additional payment amount, if any, at the same time. The holder can then trade or hold the share of the underlying security or basket of underlying securities.

For most debt securities, there is no provision for early redemption of the security, prior to the maturity date. For holders of these securities, they must rely on the secondary market if they want to liquidate their holdings. In the instant invention, even though the security has some aspects of a debt security, there is a provision for an early redemption of the security, prior to the maturity date.

However, there is a minimum holding period for the exchangeable security. During the minimum holding period, there is no provision for early redemption and a holder must rely on the secondary market if they want to liquidate their holdings. After the minimum holding period has passed, a holder of the exchangeable security may redeem shares of the exchangeable security for shares of the underlying security, as generally described above. However, there is not necessarily a one-for-one exchange, as provided on or after maturity of the exchangeable security. Instead, before maturity, the exchange occurs on a one-for-one basis or less.

Table 1 below illustrates one embodiment for redemption of a two (2) year maturity exchangeable security.

TABLE 1

| Time Period | Exchange for underlying security | Additional Payment | Total |
|---|---|---|---|
| 0-1 years | Not available | Not available | Not available |
| 1-2 years | available at 1:1, or less | Not available | 1 share of underlying |
| At or after maturity (2 years & beyond) | available at 1:1 | additional payment | 1 share of underlying plus additional payment |

In another embodiment of an early redemption, with a two year regular maturity for redemption, the early redemption value (Rv) relies on a face value of the exchangeable security (Fv), the forward (Fo), the end value (Ev), the spot value (Sv) and the rate (r), where:

$$Fo = Sv * (1 + r)^2,$$

$$Fv = Fo + 0.05, \text{ and}$$

$$Rv = Fv * \left(1 + \frac{Ev - Fo}{Fv}\right).$$

In one embodiment, with a two year maturity, the minimum holding period of the exchangeable security is six months.

It should be noted that in one embodiment, there is no provision for early redemption of the additional payment, and an early redemption of the exchangeable security prior to maturity will cancel or void the associated additional payment amount.

The various aspects of the issue and redemption, discussed above, are illustrated in FIG. 3. At step 312, system 100 determines whether a redemption is desired. If not, trading continues at step 310.

If system 100 determines from investor 104 that redemption is desired, then at step 314, system 100 determines whether the minimum holding period for the exchangeable security has passed.

If the minimum holding period has not yet passed, then at step 316, system 100 informs the holder of the exchangeable security (investor 104) that redemption is not yet possible and the exchangeable security must continue to trade on the secondary market.

If the minimum holding period has passed, then at step 318, system 100 determines whether the exchangeable security has reached maturity. If so, then at step 320, system 100 exchanges a share of the exchangeable security for a share of the underlying security, and at the same time pays the additional payment amount, if any. At the end of the exchange, investor 104, who previously held a share of the exchangeable security, has a share of the underlying security or basket of underlying securities and a cash payment, if any.

If the minimum holding period has passed, but system 100 determines that the exchangeable security has not yet reached maturity, then at step 322, system 100 exchanges a share of the exchangeable security for a fractional share up to a full share of the underlying security. The additional payment, which accompanies the exchangeable security is voided or forfeited. It should be noted that because fractional shares of securities are not generally available, it is more likely that the holder of the exchangeable securities will surrender a block of the exchangeable securities and will receive in exchange a block of the underlying securities, which is the pro-rata percentage. Any fractional underlying shares are paid in cash. Thus, as an example, if the exchangeable security is a two year maturity security, with a six month minimum holding period, and investor 104, who holds 100 shares of the exchangeable security, wants an early redemption at one year, using a redemption formula such as described above, they may receive 94 shares of the underlying security or basket of underlying securities, and no additional payment.

Examples

Table 2 below illustrates the results of the instant invention according to three different embodiments. For each of the examples, the spot or market price of a share of the underlying security or basket of securities is $100.00 at the time of issue of the new exchangeable security. At maturity of the new exchangeable security, the underlying security will have a value. The example shows various values at maturity of the underlying security ranging from $0.00 to $190.00 per share.

In the first example, labeled "Discount Only", the new exchangeable security is discounted by $0.50 from the spot or market price of the underlying security or basket of securities. Accordingly, a share of the exchangeable security is issued at the price of $99.50. Because the first example does not include any additional payment at maturity, that amount is zero. In this example, the dollar value at redemption is the same as the underlying value at maturity, because there is no additional payment. The absolute return ranges from −100% to 90.95%.

In the second example, labeled "Payment Only", there is no discount for the new exchangeable security. Accordingly, a share of the exchangeable security is issued at the price of $100.00. This second example includes an additional payment with a value of $0.50, therefore, the dollar value at redemption is $0.50 more than the underlying value at maturity. The absolute return ranges from −99.50% to 90.50%.

In the third example, labeled "Discount & Payment", the new exchangeable security is discounted by $0.50 from the spot or market price of the underlying security or basket of underlying securities. Accordingly, a share of the exchangeable security is issued at the price of $99.50. This second example also includes an additional payment with a value of $0.50, therefore, the dollar value at redemption is $0.50 more than the underlying value at maturity. The absolute return ranges from −99.50% to 91.46%.

TABLE 2

|  | Discount Only | Payment Only | Discount & Payment |
|---|---|---|---|
| Spot price of underlying at issue | 100.00 | 100.00 | 100.00 |
| Issue price of exchangeable security | 99.50 | 100.00 | 99.50 |
| Additional payment at maturity | 0.00 | 0.50 | 0.50 |

| Underlying value at maturity | $ redempt | abs. return | $ redempt | abs. return | $ redempt | abs. return |
|---|---|---|---|---|---|---|
| 0.00 | 0.00 | −100.00 | 0.50 | −99.50 | 0.50 | −99.50 |
| 10.00 | 10.00 | −89.95 | 10.50 | −89.50 | 10.50 | −89.45 |
| 20.00 | 20.00 | −79.90 | 20.50 | −79.50 | 20.50 | −79.40 |
| 30.00 | 30.00 | −69.85 | 30.50 | −69.50 | 30.50 | −69.35 |
| 40.00 | 40.00 | −59.80 | 40.50 | −59.50 | 40.50 | −59.30 |
| 50.00 | 50.00 | −49.75 | 50.50 | −49.50 | 50.50 | −49.25 |
| 60.00 | 60.00 | −39.70 | 60.50 | −39.50 | 60.50 | −39.20 |
| 70.00 | 70.00 | −29.65 | 70.50 | −29.50 | 70.50 | −29.15 |
| 80.00 | 80.00 | −19.60 | 80.50 | −19.50 | 80.50 | −19.10 |
| 90.00 | 90.00 | −9.55 | 90.50 | −9.50 | 90.50 | −9.05 |
| 100.00 | 100.00 | 0.50 | 100.50 | 0.50 | 100.50 | 1.01 |
| 110.00 | 110.00 | 10.55 | 110.50 | 10.50 | 110.50 | 11.06 |
| 120.00 | 120.00 | 20.60 | 120.50 | 20.50 | 120.50 | 21.11 |
| 130.00 | 130.00 | 30.65 | 130.50 | 30.50 | 130.50 | 31.16 |
| 140.00 | 140.00 | 40.70 | 140.50 | 40.50 | 140.50 | 41.21 |
| 150.00 | 150.00 | 50.75 | 150.50 | 50.50 | 150.50 | 51.26 |
| 160.00 | 160.00 | 60.80 | 160.50 | 60.50 | 160.50 | 61.31 |
| 170.00 | 170.00 | 70.85 | 170.50 | 70.50 | 170.50 | 71.36 |
| 180.00 | 180.00 | 80.90 | 180.50 | 80.50 | 180.50 | 81.41 |
| 190.00 | 190.00 | 90.95 | 190.50 | 90.50 | 190.50 | 91.46 |

Although illustrative embodiments have been described herein in detail, it should be noted and will be appreciated by those skilled in the art that numerous variations may be made within the scope of this invention without departing from the principle of this invention and without sacrificing its chief advantages. For example, an exchangeable security may be offered at the price of the underlying security, and at maturity, deliver more than one share of the underlying security.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

I claim:

1. A computer-implemented financial method, said method comprising the steps of:
   determining, using a programmed computer, a discount price of an underlying security;
   structuring, using the programmed computer, an exchange traded exchangeable security with a minimum holding period exchange date and an exchange maturity date, wherein said exchangeable security can be exchanged, at the option of the holder, for a predetermined specific number of shares of the underlying security at a time beginning or later than the minimum holding period and ending at the predetermined exchange maturity date, the exchangeable security linked to a pre-determined linked payment paid to the holder of said exchangeable security at said maturity date if said exchangeable security is tendered for the underlying security at a time on or after the minimum holding period through the maturity date;
   determining, using the programmed computer, the payment amount linked to the exchangeable security;
   setting, using the programmed computer, an offering price at a first time for the exchangeable security with the linked payment amount, wherein the offering price is the discounted price of the underlying security;
   issuing, using the programmed computer, the exchangeable security;

determining, using the programmed computer, at a second time if the time exceeds the minimum holding period and exchanging, the underlying security for the exchangeable security; and determining, using the programmed computer, if the second time is at or after the maturity date, and crediting the linked payment amount.

2. A method according to claim 1, wherein the payment amount is equal to the amount of the discount of the underlying security.

3. A method according to claim 1, wherein the payment amount is more than or less than the amount of the discount of the underlying security.

4. A method according to claim 1, wherein the discount price of the underlying security is based on a market price of a share of the underlying security.

5. A method according to claim 1, wherein the discount price of the underlying security is based on a closing price of a share of the underlying security.

6. A method according to claim 1, wherein the underlying security is a basket of securities and exchanging a share of the underlying security for a share of the exchangeable security at the second time further comprises exchanging, using the programmed computer, the basket of securities for a share of the exchangeable security.

7. A method according to claim 1, wherein the second time is a defined period after the first time, the defined period selected from the group including one month, one quarter, semi-annual, single year and multiple years.

8. A method according to claim 1, wherein the second time is two years after the first time.

9. A method according to claim 1, wherein exchanging the underlying security for the exchangeable security further comprises:
   receiving, using the programmed computer, a share of the exchangeable security; and
   delivering, using the programmed computer, a share of the underlying security.

10. A method according to claim 1, wherein exchanging the underlying security for the exchangeable security further comprises:
   receiving, using the programmed computer, a share of the exchangeable security; and
   delivering, using the programmed computer, an amount representing the value of a share of the underlying security at the second time.

\* \* \* \* \*